United States Patent
Yuill et al.

(10) Patent No.: US 6,835,361 B2
(45) Date of Patent: Dec. 28, 2004

(54) PROCESSES AND APPARATUS FOR REACTING GASEOUS REACTANTS CONTAINING SOLID PARTICLES

(75) Inventors: William A. Yuill, Edmond, OK (US); Charles A. Natalie, Edmond, OK (US)

(73) Assignee: Kerr-McGee Chemical LLC, Oklahoma City, OK (US)

( * ) Notice: Subject to any disclaimer, the term of this patent is extended or adjusted under 35 U.S.C. 154(b) by 846 days.

(21) Appl. No.: 09/822,565

(22) Filed: Mar. 30, 2001

(65) Prior Publication Data

US 2001/0021360 A1 Sep. 13, 2001

Related U.S. Application Data

(63) Continuation-in-part of application No. 09/361,003, filed on Jul. 27, 1999, now Pat. No. 6,350,427.

(51) Int. Cl.[7] .............................. B01D 5/00; B01D 7/00
(52) U.S. Cl. ........................ 422/244; 422/134; 422/156
(58) Field of Search ................................ 422/244, 134, 422/156, 145, 194, 196

(56) References Cited

U.S. PATENT DOCUMENTS

| | | | |
|---|---|---|---|
| 3,120,427 A | 2/1964 | Mas et al. ..................... 23/202 |
| 3,297,411 A | 1/1967 | Dear ............................ 23/284 |
| 3,582,278 A | 6/1971 | Kulling et al. ................ 23/202 |
| 3,647,377 A | 3/1972 | Hilgers et al. ............ 23/202 V |
| 3,725,526 A | 4/1973 | Pieri et al. ................... 423/613 |
| 3,764,667 A | 10/1973 | Thring et al. ................ 423/613 |
| 3,914,396 A | 10/1975 | Bedetti et al. .............. 423/613 |
| 3,966,892 A | 6/1976 | Okudaira et al. ........... 423/613 |
| 4,012,201 A | 3/1977 | Powell et al. ............. 23/277 R |
| 4,053,577 A | 10/1977 | Arkless ....................... 423/592 |
| 4,274,942 A | * 6/1981 | Bartholic et al. ........... 208/113 |
| 4,803,056 A | 2/1989 | Morris et al. ................ 422/156 |
| 5,196,181 A | 3/1993 | Hartmann .................... 423/613 |
| 5,556,600 A | 9/1996 | Gebben et al. ............. 422/108 |
| 5,573,744 A | 11/1996 | Gebben et al. ............. 423/613 |
| 5,683,669 A | 11/1997 | Hartmann et al. .......... 423/491 |
| 5,723,041 A | * 3/1998 | Devanathan et al. ........ 208/158 |
| 5,749,937 A | 5/1998 | Detering et al. ........... 75/10.19 |
| 5,840,112 A | 11/1998 | Morris et al. ................ 106/442 |

* cited by examiner

Primary Examiner—M. Alexandra Elve
(74) Attorney, Agent, or Firm—McAfee & Taft

(57) ABSTRACT

The present invention provides improved processes and apparatus for reacting high flow rates of one or more gaseous reactants in tubular reactors. The improved processes and apparatus allow such reactions to be carried out with a low pressure drop across the reactor and without excessive erosion due to solid particles carried with or picked up by the gaseous reactants. A process of this invention is basically comprised of the steps of swirling a gaseous reactant which may contain or pick up solid particles in a first annular plenum chamber followed by a second larger diameter annular plenum chamber and then introducing the gaseous reactant and solid particles into a reactor by way of two or more radial slots whereby said gaseous reactant and solid particles are caused to flow into said reactor and are uniformly distributed therein.

30 Claims, 4 Drawing Sheets

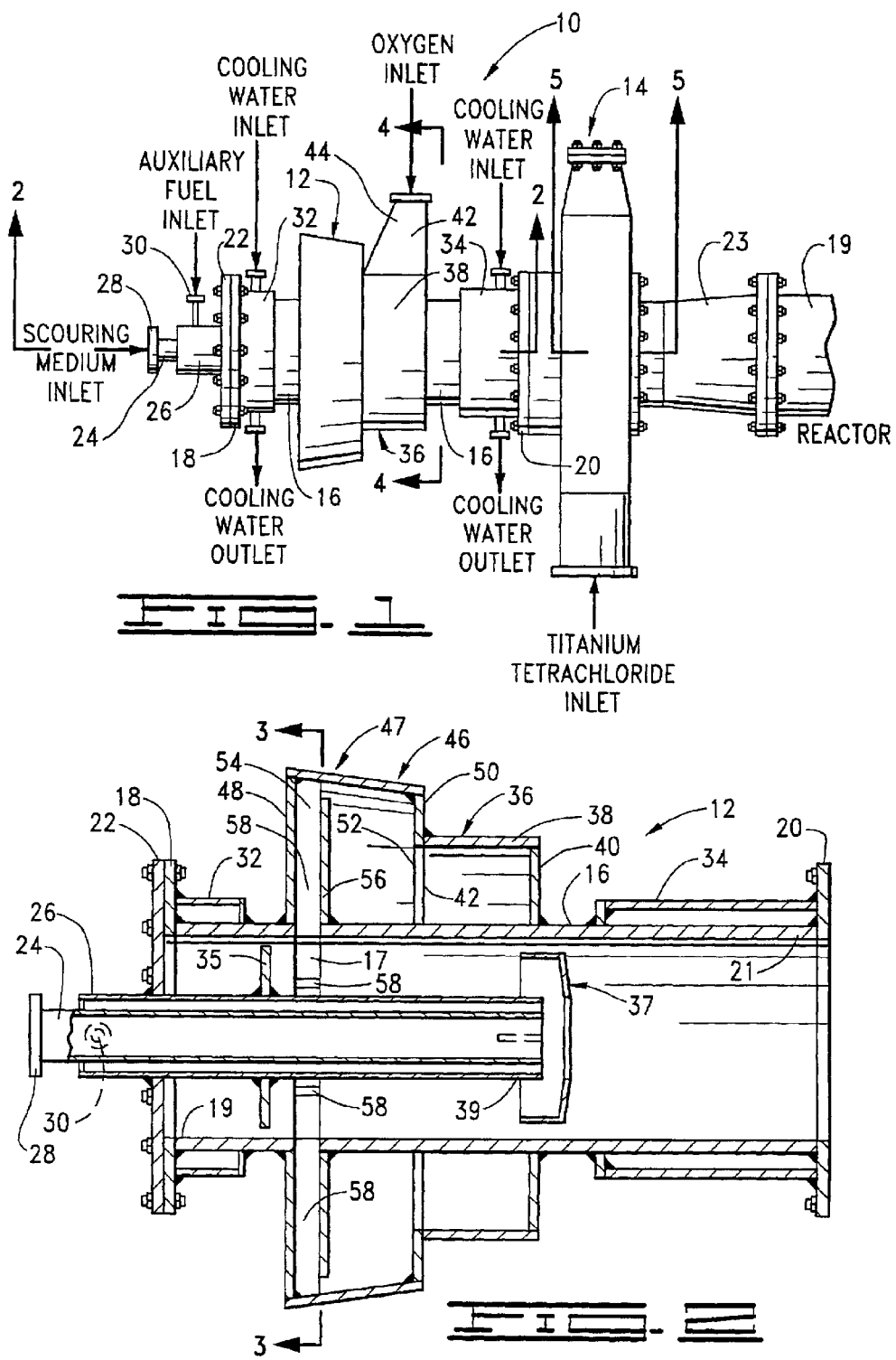

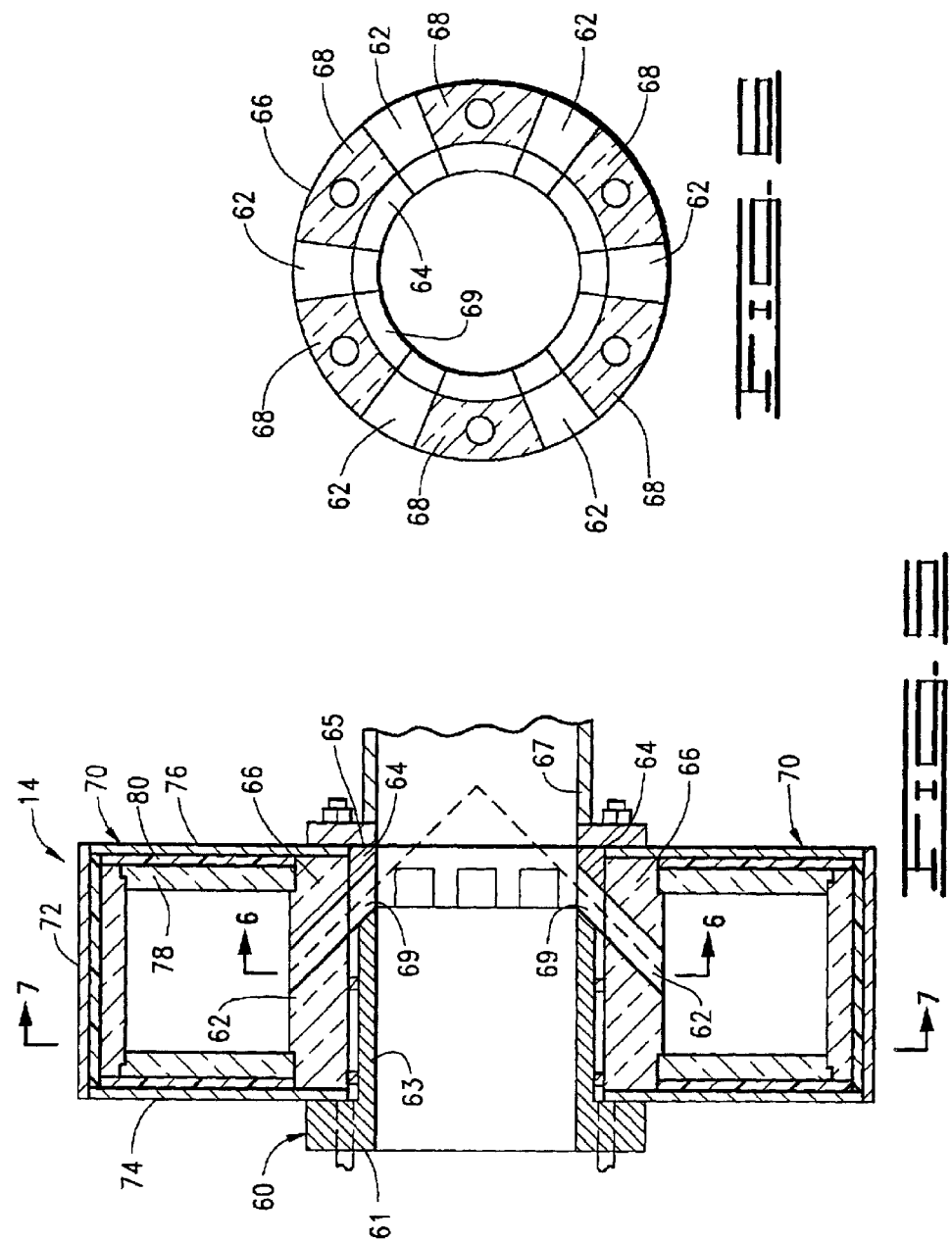

PROCESSES AND APPARATUS FOR REACTING GASEOUS REACTANTS CONTAINING SOLID PARTICLES

The present application is a continuation-in-part of U.S. patent application Ser. No. 09/361,003, filed Jul. 27, 1999 now U.S. Pat. No. 6,350,427.

BACKGROUND OF THE INVENTION

1. Field of the Invention

The present invention relates to processes and apparatus for reacting high flow rates of gaseous reactants containing particulate solids in tubular reactors, and more particularly, to reacting high flow rates of oxygen and titanium tetrachloride gas which can contain or pick up particulate solid contaminants in a tubular reactor at high temperature to produce titanium dioxide.

2. Description of the Prior Art

In reactions carried out in tubular reactors where high flow rates of gaseous reactants are injected into the reactors, problems with incomplete mixing and severe erosion of the side walls of the reactors due to the presence of particulate solid contaminants in the reactants can occur. The incomplete mixing can cause less than desirable reaction results and the erosion causes contamination of the products produced with the materials forming the reactors as well as drastically shortening the lives of the reactor apparatus. For example, in the production of titanium dioxide, the gaseous reactants are heated oxygen and heated titanium tetrachloride gas which are combined in a tubular reactor at high flow rates. A high temperature oxidation reaction takes place in the reactor whereby solid titanium dioxide particles are produced. Occasionally, both the oxygen and the titanium tetrachloride gas streams utilized in the reaction contain or pick up particulate solid contaminants which impinge on the surfaces of the reactor apparatus. Such particulate solid contaminants get into the gas streams as a result of the passage of the gas streams through process equipment and piping upstream of the reactor apparatus. The process equipment and piping can contain particulate solid scale, solid particles from fluidized beds, particulate welding slag and the like. Also, a particulate solid scouring medium such as sand is often introduced into the reactor apparatus to scour titanium dioxide deposited on the walls of the reactor therefrom. The scouring medium occasionally finds its way into various upstream parts of the reactor apparatus and some of it is picked up and carried by the gaseous reactant streams. For example, if the scouring medium is being introduced into the reactor apparatus when the flow of oxygen or titanium tetrachloride is shut down, the scouring medium can flow out of the reactor into oxygen or titanium tetrachloride introduction apparatus, e.g., plenum chambers, connected to the reactor.

In attempts to solve the problems mentioned above, large plenum chambers have heretofore been utilized upstream of the reactor injection points of gaseous reactants to trap contaminants therein, and the gaseous reactants have been injected through small gaps. The use of small gaps results in high pressure drops which bring about good mixing of gases in the reactor, but the high pressure drops in the gaseous reactants require their pressurization which is very costly.

In order to operate with lower gaseous reactant pressure drops, the gaseous reactants have heretofore been tangentially injected into small annular plenum chambers which distribute them around two or more slots through which the gaseous reactants flow radially into the reactor. The use of injection through the slots brings about low pressure drops, but particulate solid contaminants carried or picked up by the gaseous reactants can be trapped in the annular plenum chambers which causes the plenum chambers to be rapidly eroded.

Thus, there are needs for improved processes and apparatus for reacting gaseous reactants in tubular reactors which bring about low pressure drops across the reactor apparatus, more uniform distribution of the gaseous reactants and better mixing of the gaseous reactants without excessive erosion due to the presence of solid particles.

SUMMARY OF THE INVENTION

The present invention provides improved processes and apparatus for reacting solid particle containing gaseous reactants in tubular reactors which meet the needs described above and overcome the deficiencies of the prior art.

A process of the present invention for reacting a high flow rate of a gaseous reactant which can contain or pick up solid particles in a tubular reactor is comprised of the following steps. The gaseous reactant to be injected is swirled in a first annular plenum chamber followed by a second larger diameter annular plenum chamber. The swirling gaseous reactant is then introduced into the reactor by way of two or more radial slots communicating the reactor with the outlet of the second plenum chamber whereby solid particles carried with the gaseous reactant are caused to flow into the reactor with the gaseous reactant and are not trapped in the first or second plenum chambers. The radial slots bring about the uniform distribution and alignment of the flow of the gaseous reactants and solid particles through the center of the reactor and thereby prevent incomplete mixing and erosion therein. In the production of titanium dioxide, the above described process is preferably utilized for injecting high flow rates of heated oxygen into the reactor.

Another process of this invention which can also be utilized for introducing a high flow rate of a gaseous reactant into a tubular reactor which meets the above described needs is as follows. The high flow rate gaseous reactant which can contain solid particles is swirled in an annular plenum chamber which includes a boot formed therein for catching the solid particles. The resulting substantially solid particle free gaseous reactant is introduced into the reactor by way of two or more radial slots communicating the reactor with the plenum chamber. A conduit is optionally provided in the plenum chamber extending from the interior of the boot to within one of the annular slots whereby the gas pressure differential between the boot and the slot causes the solid particles caught in the boot to be swept through the conduit into the reactor. The radial slots are preferably slanted in the downstream direction to facilitate the uniform distribution and alignment of the flow of the gaseous reactant and solid particles (if any) through the center of the reactor and thereby prevent incomplete mixing and erosion therein. In the production of titanium dioxide, this process is preferably utilized for injecting high flow rates of heated titanium tetrachloride into the reactor.

Apparatus for carrying out the above described processes are also provided by the present invention.

It is, therefore, a general object of the present invention to provide improved processes and apparatus for reacting solid particle containing gaseous reactants in tubular reactors.

A further object of the present invention is the provision of improved processes and apparatus for reacting high flow rates of oxygen and titanium tetrachloride gas which may contain or pick up particulate solid contaminants in a reactor for producing titanium dioxide.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is a top view of the solid particle containing gaseous reactant injection apparatus of this invention connected to a tubular reactor.

FIG. 5 is a side cross-sectional view taken along line 5–5 of FIG. 1.

FIG. 6 is a cross-sectional view taken along line 6—6 of FIG. 5.

FIG. 7 is a cross-sectional view taken along line 7—7 of FIG. 5.

DESCRIPTION OF PREFERRED EMBODIMENTS

Figure 3:
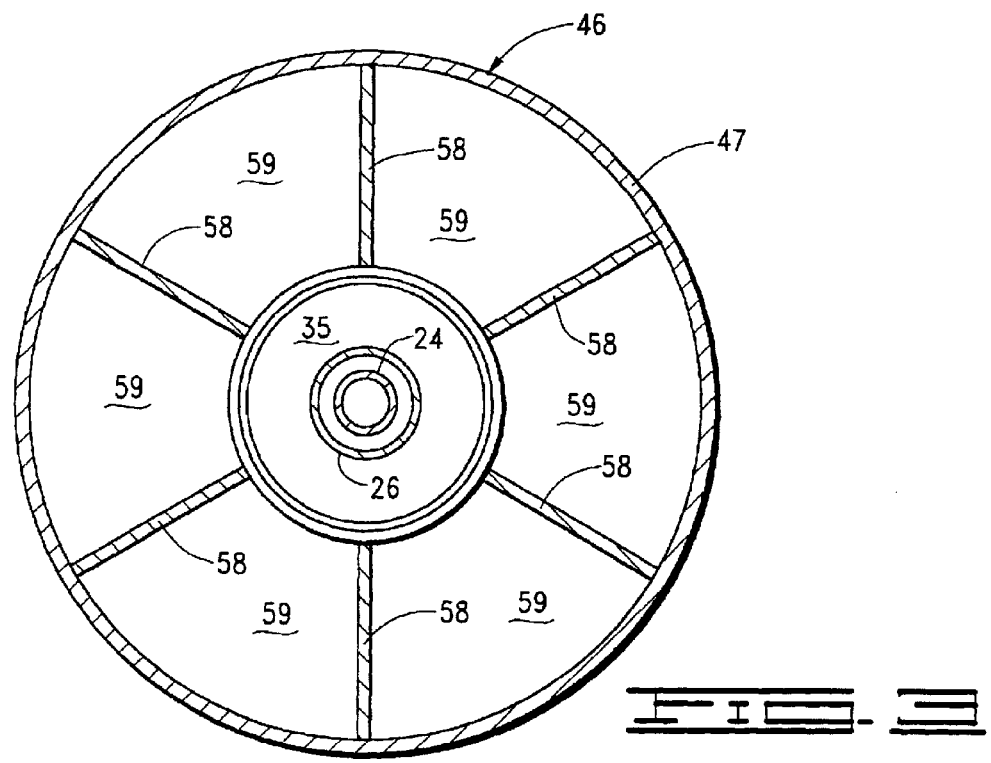
FIG. 3 is a cross-sectional view taken along line 3—3 of FIG. 2.

Referring now to FIGS. 1 through 6 of the drawings, the apparatus of the present invention for injecting high flow rates of gaseous reactants containing solid particles into a tubular reactor is illustrated. The term "high flow rates" is used herein to mean flow rates in the range of from about 400 to about 3,000 or higher standard cubic feet per minute.

In FIG. 1, the apparatus of this invention is illustrated in combination with a tubular reactor for producing titanium dioxide from heated oxygen and heated titanium tetrachloride gas streams which can contain or pick up particulate solid contaminants and which are injected at high flow rates into the tubular reactor. The tubular reactor can be of any known reactor design including those that are cooled with water or other heat exchange medium, those which are not cooled, those that are formed of a porous medium, etc.

The apparatus of FIG. 1, generally designated by the numeral 10, is comprised of a first form of gaseous reactant introduction apparatus 12 and a second form of gaseous reactant introduction apparatus 14, both for introducing high flow rates of gaseous reactants which may contain solid particles into the tubular reactor 19. The apparatus 12 and 14 can each be utilized for injecting any high flow rate gaseous reactant which does or may contain solid particles into a tubular reactor. In apparatus for producing titanium dioxide, the gaseous reactant introduction apparatus 12 and 14 can be utilized for introducing either the heated oxygen or the heated titanium tetrachloride gas streams into the titanium dioxide production reactor 19. However, the gaseous reactant introduction apparatus 12 shown in FIGS. 1–4 is preferred for introducing the heated oxygen stream into the reactor 19. The gaseous reactant introduction apparatus 14 shown in FIGS. 1 and 5–7 is preferred for introducing the heated titanium tetrachloride gas stream which is highly corrosive into the reactor 19.

In operation, both the apparatus 12 and the apparatus 14 introduce high flow rates of gaseous reactants which may contain solid particles into the tubular reactor 19 with low pressure drops, with uniform distribution and good mixing of the gaseous reactant streams in the reactor and without excessive plenum chamber or reactor erosion due to the presence of solid particles carried with the gaseous reactants.

As shown in FIGS. 1–4, the apparatus 12 is comprised of a cylindrical gaseous reactant injection chamber 16 having an annular opening 17 around the periphery thereof and flange connections 18 and 20 connected to the forward and rearward ends 19 and 21 thereof, respectively. A closing flange 22 is attached to the flange 18. A conduit 24 is sealingly connected through the flange 22 and extends into the cylindrical injection chamber 16. The conduit 24 is positioned coaxially with the cylindrical injection chamber 16 and a second conduit 26 which is also sealingly connected through the flange 22 is coaxially disposed around the conduit 24. An inlet flange 28 is connected to the conduit 24 and a flanged inlet connection 30 is connected to the conduit 26. As indicated in FIG. 1, when the gaseous reactant introduction apparatus 12 is utilized with a water cooled titanium dioxide production reactor, a source of auxiliary fuel, e.g., methane, propane or toluene, is connected to the inlet connection 30 of the conduit 26, and a source of reactor scouring medium is connected to the inlet connection 28 of the conduit 24. The auxiliary fuel is utilized to provide additional heat and to stabilize the oxidization reaction in the reactor 19. The fuel is oxidized to carbon dioxide and water and the water formed promotes rutilization which improves the properties of the titanium dioxide produced. The reactor scouring medium which can be sand, rock salt, sintered titanium dioxide, compressed titanium dioxide or the like is injected into the reactor apparatus to scour titanium dioxide from the cooled walls of the reactor. As the titanium dioxide is formed in the reactor, some of it deposits on the walls of the cooled portions of the reactor, e.g., the part of the reactor cooled by water or other means. Unless removed, the titanium dioxide will continuously build up and substantially interfere with the cooling process. Thus, the scouring medium must be continuously introduced into the reactor.

The injection chamber 16 also includes a pair of cooling water jackets 32 and 34 for cooling the walls of the injection chamber. In addition, an annular heat shield 35 is disposed within the cylindrical gaseous reactant injection chamber 16 between the annular opening 17 in the injection chamber and the forward end 19 thereof. The heat shield 35 can be welded to the conduit 26 and it functions to shield the forward end portion of the cylindrical gaseous reactant injection chamber 16 from the heat produced by the heated gaseous reactant (heated oxygen) introduced through the annular opening 17 thereof. Also, as will be described further hereinbelow, a deflector 37 for deflecting the flow of the heated oxygen introduced into the injection chamber 16 by way of the opening 17 and causing it to be uniformly distributed is attached to the rearward end portion 39 of the conduit 26.

Figure 4:
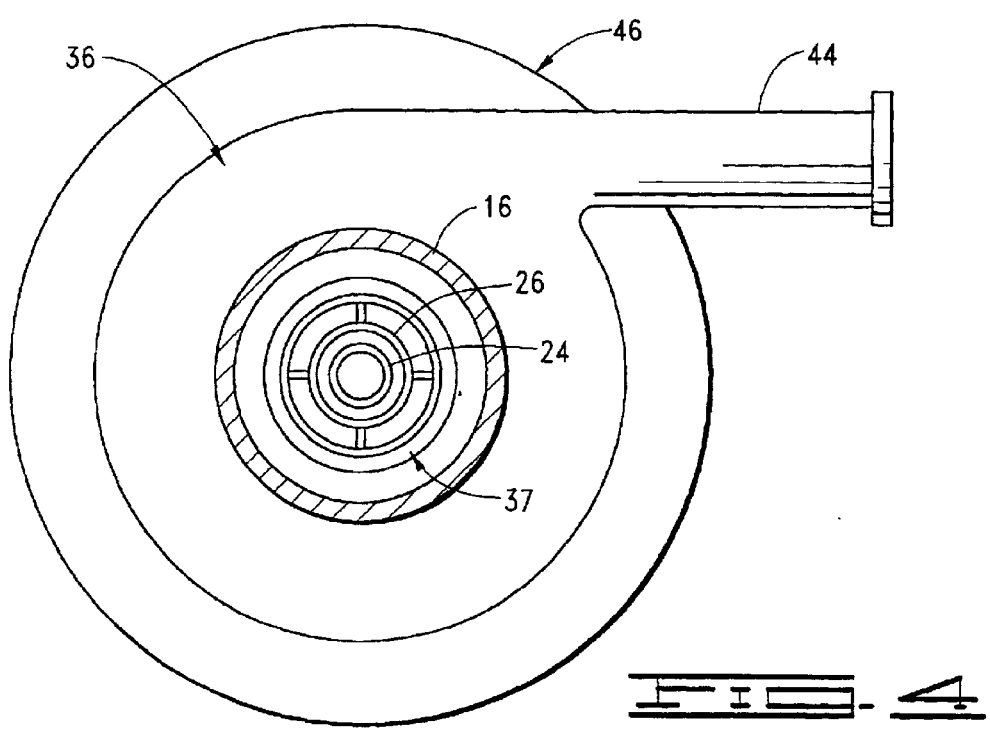
FIG. 4 is a cross-sectional view taken along line 4—4 of FIG. 1.
Figure 2:
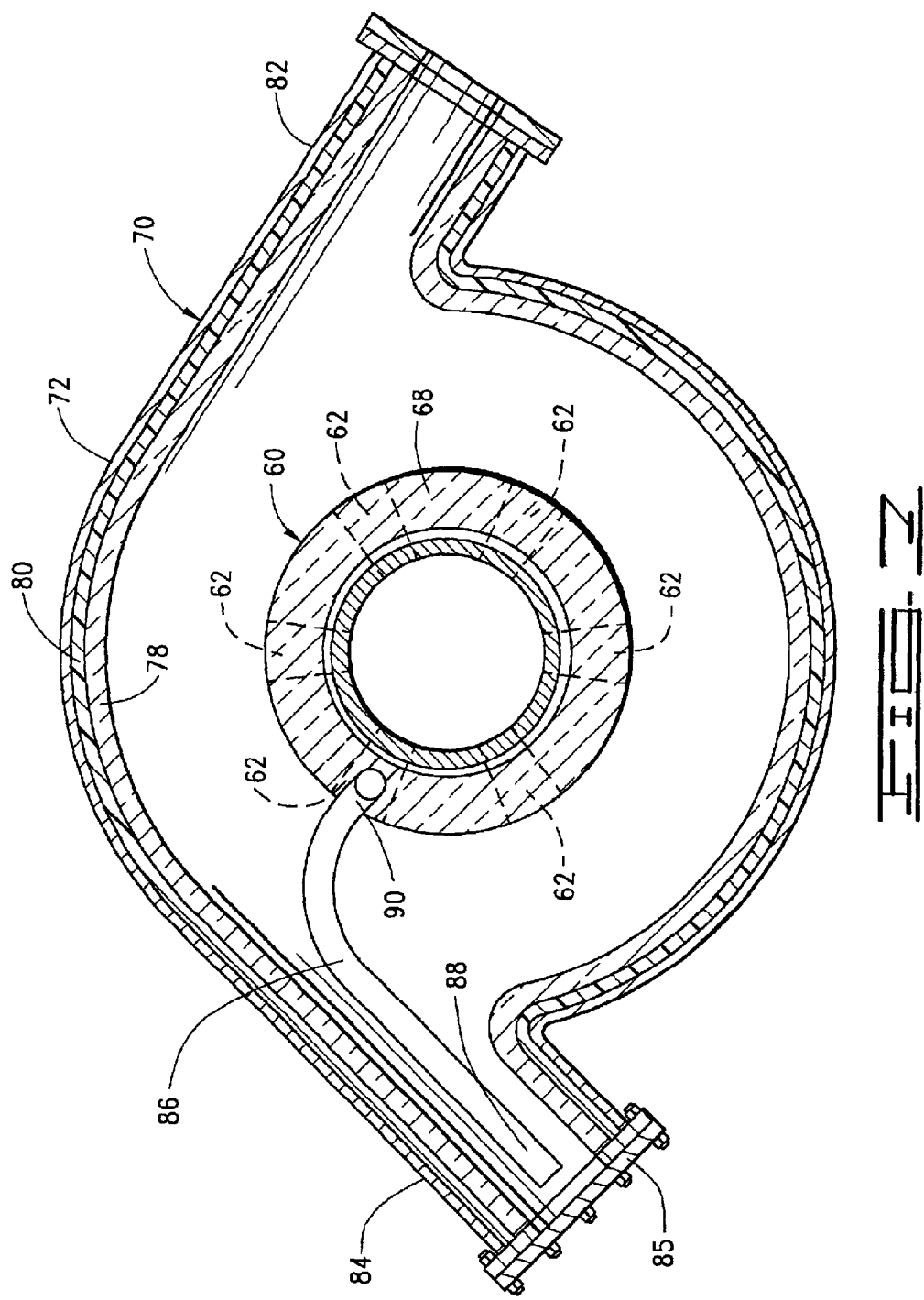
FIG. 2 is a side cross-sectional view taken along line 2—2 of FIG. 1.

A first annular plenum chamber 36 is provided having an annular outside wall 38, a side 40 sealingly attached to the exterior of the gaseous reactant injection chamber 16 and an annular side outlet 42. As best shown in FIG. 4, the first annular plenum chamber 36 also includes a tangential inlet 44 for receiving a high flow rate stream of heated oxygen which may contain solid particles and causing the stream to swirl within the plenum chamber 36.

A second annular plenum chamber 46 having an annular outside wall 47 and sides 48 and 50 is also sealingly attached to the exterior of the injection chamber 16. The side 50 of the second plenum chamber 46 is attached to the outside wall 38 of the first plenum chamber 36 and the second plenum chamber 46 includes an annular side inlet 52 which coincides with the annular side outlet 42 of the first plenum chamber 36. As shown in the drawings, the second plenum chamber 46 has a larger diameter than the first plenum chamber 36 and the second plenum chamber 46 covers the annular opening 17 around the periphery of the injection chamber 16.

An annular slot 54 is formed within the second plenum chamber 46 adjacent to the side 48 thereof by an annular plate 56 which is sealingly attached to the exterior of the injection chamber 16 and extends to near the outside wall 47 of the second plenum chamber 46. The annular slot 54 formed by the side 48 of the second plenum chamber 46 and the annular plate 56 is sealingly attached over the annular opening 17 in the injection chamber 16. Thus, as will be described in greater detail hereinbelow, the high flow rate of heated oxygen which may contain solid particles conducted to the tangential inlet 44 of the first plenum chamber 36 is caused to swirl within the first plenum chamber 36 followed by swirling in the larger second plenum chamber 46 and flowing out of the second plenum chamber 46 by way of the annular slot 54 into the interior of the injection chamber 16. Because the heated oxygen stream is first swirled within the smaller plenum chamber 36 and then expanded and swirled in the plenum chamber 46, solid particles contained in the stream are moved by centrifugal force to the outside walls 38 and 47 of the plenum chambers 36 and 46 from where the solid particles are caused to flow along with the heated oxygen through the slot 54 into the interior of the injection chamber 16 and the solid particles are not trapped within the plenum chambers 36 and 46. As is well understood by those skilled in the art, when solid particles are trapped within a plenum chamber in which a high velocity gas stream is swirled, the solid particles erode and cut through the material forming the plenum chamber in a very short period of time. As shown best in FIG. 2, the outside wall 47 of the plenum chamber 46 is sloped outwardly towards the side 48 thereof to facilitate the movement of the solid particles into the slot 54.

As best shown in FIG. 3, the annular slot 54 includes a plurality of spaced vanes 58 attached therein which form a plurality of radial slots 59 (FIG. 3) in the opening 54. The radial slots 59 function to stop the heated oxygen stream from swirling and uniformly distribute the flow of the heated oxygen stream and solid particles carried therewith into and through the center of the injection chamber 16. The deflector 37 attached to the interior end portion 39 of the conduit 26 functions to cause the heated oxygen stream to be uniformly distributed and to uniformly flow through the center of the injection chamber 16, the titanium tetrachloride gas introduction apparatus 14 and the reactor 19 thereby preventing incomplete mixing and erosion from taking place.

Thus, the process carried out in the apparatus 12 basically comprises the steps of swirling the gaseous reactant to be introduced into the reactor 19 in the first annular plenum chamber 36 followed by the second larger diameter annular plenum chamber 46. The swirling gaseous reactant and solid particles carried therewith are introduced into the reactor 19 by way of the radial slots 59 and the injection chamber 16. That is, the gaseous reactant and solid particles flow through the radial slots 59 into the injection chamber 16 and then into the reactor 19 and the solid particles are not trapped in the first or second plenum chambers. The radial slots 59 and the deflector 37 disposed within the injection chamber 16 cause the gaseous reactant and solid particles to flow into and through the injection chamber 16 in a manner whereby the gaseous reactant and solid particles uniformly flow through the centers of the injection chamber 16 and reactor 19 thereby preventing incomplete mixing and erosion therein. As mentioned, when the apparatus 12 is utilized in a process for producing titanium dioxide, the gaseous reactant introduced into the reactor 19 by way of the apparatus 12 is preheated oxygen, i.e., oxygen preheated to a temperature in the range of from about 1000° F. to about 1800° F., preferably from about 1500° F. to about 1800° F. In addition, an auxiliary fuel is preferably introduced into the injection chamber 16 and reactor 19 by way of the conduit 26, and a scouring medium for scouring the walls of the reactor are introduced into the injection chamber 16 and reactor 19 by way of the conduit 24. Also, potassium chloride, cesium chloride or the like can be added to the heated oxygen introduced into the reactor 19 to control the particle size of the titanium dioxide produced.

Referring now to FIGS. 1 and 5–7, the apparatus 14 for introducing a high flow rate of a gaseous reactant (heated titanium tetrachloride) which contains or may contain solid particles into the reactor 19 is illustrated. As best shown in FIG. 5, the apparatus 14 includes a cylindrical gaseous reactant injection chamber 60 having a forward end 61 and a rearward end 65 adapted to be sealingly connected to the upstream end of the tubular reactor 19 by way of a conical connecting pipe section 23 (FIG. 1) and having an annular opening 69 formed therein around the periphery thereof. As will be understood by those skilled in the art, the apparatus 14 can be formed of various materials which have desired insulating, corrosion resistant and other properties. In the form illustrated in the drawings for use in apparatus for producing titanium dioxide, the injection chamber 60 is comprised of a cylindrical wall member 63 formed of a heat insulating refractory material, a cylindrical member 64 formed of corrosion resistant metal material and a cylindrical member 66 formed of a corrosion resistant silicon carbide material. The annular opening 69 is preferably angled towards the rearward end 65 of the injection chamber 60 as shown in FIG. 5, and the annular opening 69 includes a plurality of spaced vanes 68 (FIG. 6) disposed therein which form a plurality of radial slots 62 therein. The radial slots 62 and annular opening 69 are angled in order to prevent oxygen from entering them, the build up of oxides in the slots which can lead to plugging and to facilitate uniform distribution in the injection chamber 60. The vanes 68 can be integrally formed in the cylindrical member 66 as shown in the drawings. Also, when auxiliary fuel is utilized for providing additional heat as described above, the cylindrical wall member 63, the pipe section 67, the conical connecting pipe section 23 (FIG. 1) and the reactor 19 (FIG. 1) are all water cooled (not shown) to prevent damage thereto as a result of the high temperatures involved.

An annular plenum chamber 70 having an outside wall 72 and sides 74 and 76 formed of a metal such as steel is sealingly attached to the exterior of the cylindrical gaseous reactant injection chamber 60. The interior of the annular plenum chamber 70 is lined with a silicon carbide corrosion resistant material 78 and a gasket material 80 is disposed between the corrosion resistant material 78 and the outside wall 72 and sides 74 and 76. As will be understood, insulating and corrosion resistant materials or techniques other than those described above can be utilized in the apparatus 14.

For example, cylindrical member 64, which may be referred to as a distributor wear plate may be formed of a ceramic material as opposed to metal. As used herein and in the appended claims, a ceramic material means a material manufactured by the action of heat on one or more earthy raw materials. Examples of earthy raw materials useful in forming ceramic materials are materials based on silicon or zirconium together with aluminum and/or nitrogen, oxides of silicon, oxides of aluminum and silicates.

Preferably, the ceramic material used in forming cylindrical member 64 is selected from the group consisting of alumina, silica, alumina-silica, silicon carbides, silicon nitrides, and aluminum nitrides. More preferably, the ceramic material used in forming cylindrical member 64 is selected from the group consisting of silicon nitrides and aluminum nitrides. Ceramic materials formed of silicon-aluminum oxy nitride are most preferred. For example, the ceramic material forming cylindrical member 64 can be formed of a silicon-aluminum oxy nitride comprising approximately 90% by weight silicon nitride and approximately 10% by weight alumina, the weight percents being based on the total weight of the ceramic material.

Silicon-aluminum oxy nitrides as a general class of ceramic material consist of silicon nitride that is sintered with alumina ($Al_2O_3$), aluminum nitride (AlN), yttrium oxide ($Y_2O_3$) or some other glass-forming oxide and fused at high temperature. The alumina strengthens the ceramic and is itself very wear-resistant. An example of a silicon-aluminum oxy nitride that is very suitable for use in connection with the present invention is sold by International Syalons in association with the trademark SYALON.

The use of a ceramic material in forming the cylindrical member 64 greatly increases the service life of the member 64. Initially, corrosion-resistant metal material was used as the cylindrical member 64 and was placed in service for approximately four (4) weeks. When the metal wear plate was removed, it exhibited signs of excessive abrasion. Other materials were utilized to test the ability to withstand the extreme conditions and the abrasive components passing therethrough.

It was discovered that greatly improved results were obtained when the cylindrical member 64 was formed of a ceramic material, specifically SYALON. A cylindrical member 64 formed of SYALON was tested under normal use conditions for a period of 14 weeks. The wear plate was subsequently examined and showed abrasive-resistant abilities superior to the corrosion-resistant metals that had been used previously.

As best shown in FIG. 7, a tangential inlet 82 for receiving a high flow rate stream of heated titanium tetrachloride gas which contains or may contain solid particles is attached to the plenum chamber 70. The tangential inlet 82 causes the titanium tetrachloride gas stream to swirl within the plenum chamber 70. A tangential boot 84 is formed in the plenum chamber 70 downstream from the tangential inlet 82 thereof for catching solid particles carried with the titanium tetrachloride gas stream. The boot 84 includes a removable blind flange 85 bolted thereto for periodically removing solid particles therefrom. Thus, as will be described further hereinbelow, the titanium tetrachloride gas stream containing solid particles is swirled within the plenum chamber 70, the solid particles are caught in the boot 84 and the resulting substantially solid particle free titanium tetrachloride stream flows into the injection chamber 60 by way of the radial slots 62 and opening 69.

As best shown in FIG. 7, a conduit 86 can optionally be attached within the plenum chamber 70 which has one end 88 extending into the boot 84 and the other end 90 extending into a radial slot 62. The gas pressure differential between the boot 84 and the radial slot 62 causes solid particles caught in the boot 84 to be swept along with a portion of the titanium tetrachloride gas stream through the conduit 86 into the injection chamber 60 and the reactor 19.

The spaced vanes 68 disposed in the annular slot 69 which form the radial slots 62 cause the titanium tetrachloride gas stream to slow or stop swirling and to be uniformly distributed in the injection chamber 60 in a manner such that the gas stream and solid particles (if any) flow through the center of the injection chamber 60 and reactor 19 thereby preventing incomplete mixing and erosion therein. particles (if any) flow through the center of the injection chamber 60 and reactor 19 thereby preventing incomplete mixing and erosion therein.

Thus, the process carried out in the apparatus 14 basically comprises swirling the gaseous reactant that may contain or pick up solid particles in the annular plenum chamber 70 which includes a boot 84 formed therein for catching the solid particles. The resulting substantially solid particle free swirling gaseous reactant flows into the injection chamber 60 by way of the radial slots 62 and annular opening 69. The solid particles caught in the boot 84 can be manually withdrawn therefrom periodically or they can be withdrawn continuously by the conduit 86 and caused to flow into a slot 62. As mentioned above, the plurality of radial slots 62 function to cause the gaseous reactant and solid particles (if any) to be uniformly distributed in the injection chamber 60 and align the flow of the gaseous reactant and solid particles through the center of the injection chamber 60.

As also mentioned, when the apparatus 14 is utilized in a process for producing titanium dioxide, the gaseous reactant introduced into the reactor 19 by the apparatus 14 is titanium tetrachloride gas, i.e., titanium tetrachloride gas preheated to a temperature in the range of from about 350° F. to about 1800° F., preferably from about 750° F. to about 1100° F. As will be understood, aluminum chloride can be added to the heated titanium tetrachloride to enhance rutilization of the produced titanium dioxide and make it more durable.

The process of the present invention carried out in the apparatus 10 shown in FIG. 1 for producing titanium dioxide by reacting high flow rates of oxygen and titanium tetrachloride gases in the tubular reactor 19 is generally carried out at a pressure of at least about 2 psig and a temperature of at least about 2200° F. Also, the temperatures of the oxygen and titanium tetrachloride streams are controlled so that the temperature of the composite stream before reaction is in the range of from about 900° F. to about 1800° F., preferably about 1450° F. The process carried out in the apparatus 10 basically comprises the steps of swirling heated oxygen which contains or may contain solid particles in the first annular plenum chamber 36 followed by the second larger diameter annular plenum chamber 46. The swirling oxygen is introduced into the reactor 19 by way of the oxygen injection chamber 16 through a first set of radial slots 59 communicating the injection chamber 16 with the outlet of the second plenum chamber 46 whereby solid particles contained therein are caused to flow into the injection chamber with the oxygen and are not trapped in the first or second plenum chambers. The radial slots 59 are formed by a plurality of spaced vanes 58 disposed in the annular opening 54. The radial slots 59 uniformly distribute and facilitate the alignment of the flow of the oxygen and solid particles carried therewith through the centers of the oxygen injection chamber 16, the titanium tetrachloride injection chamber 60 and the reactor 19 and thereby prevent incomplete mixing and erosion therein. The deflector 21 also functions to align the flow of the heated oxygen and mix the combustion products.

The titanium tetrachloride gas which contains or may contain solid particles is swirled in the third annular plenum chamber 70 which includes a boot 84 formed therein for catching the solid particles. The resulting substantially solid particle free swirling titanium tetrachloride gas is introduced into the injection chamber 60 and into the reactor 19 by way of a second set of radial slots 62 communicating the injection chamber 60 with the plenum chamber 70. A conduit 86 is optionally provided in the plenum chamber 70 extending from the interior of the boot 84 to within a slot 62 whereby the gas pressure differential between the boot 84 and the slot 62 causes the solid particles caught in the boot to be swept through the conduit into the injection chamber 60 and the reactor 19. The spaced vanes 68 disposed in the annular opening 69 form the slots 62 which cause the titanium tetrachloride gas to be uniformly distributed in the injection chamber 60 and align the flow of the titanium tetrachloride gas and solid particles carried therewith (if any) through the center of the injection chamber 60 and the reactor 19 thereby preventing incomplete mixing and erosion therein.

As will now be understood by those skilled in the art, the improved processes and apparatus of the present invention for reacting gaseous reactants containing solid particles at high flow rates in tubular reactors make it possible to carry out the reactions at low pressure drops with uniform distribution and better mixing of gases in the reactors without excessive erosion. As will also be understood by those skilled in the art, the improved processes and apparatus of the present invention can be utilized for reacting a variety of reactants containing solid particles at high flow rates and temperatures. The processes and apparatus are particularly suitable for reacting preheated oxygen and preheated titanium tetra- chloride containing solid particles in tubular reactors for producing titanium dioxide. In addition, they are suitable for reacting preheated oxygen with other preheated metal chlorides such as silicon tetrachloride, zirconium tetrachloride, aluminum tetrachloride and the like.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. An improved apparatus for introducing a high flow rate of a gaseous reactant which contains or picks up solid particles into a tubular reactor comprising:
    a cylindrical gaseous reactant injection chamber having a closed forward end and a rearward end adapted to be sealingly connected to the upstream end of said tubular reactor and having an annular opening around the periphery thereof;
    a first annular plenum chamber having an outside wall and at least one side sealingly attached to the exterior of said gaseous reactant injection chamber, said first plenum chamber having an annular side outlet and having a tangential inlet for receiving a high flow rate stream of said gaseous reactant containing solid particles and for causing said stream to swirl therein;
    a second annular plenum chamber having an outside wall and sides and having a larger diameter than said first plenum chamber sealingly attached to the exterior of said gaseous reactant injection chamber, said second plenum chamber having an annular side inlet sealingly attached to said annular side outlet of said first plenum chamber;
    an annular slot formed within said second plenum chamber adjacent to the side thereof opposite from said annular side inlet thereof, said annular slot being sealingly attached over said annular opening in said gaseous reactant injection chamber and extending to near the outside wall of said second plenum chamber; and
    a plurality of spaced vanes attached within said annular slot to thereby form two or more radial slots therein.

2. The apparatus of claim 1 which further comprises a gaseous reactant deflector disposed within said cylindrical gaseous reactant injection chamber for aligning and distributing said gaseous reactant therein whereby it flows through the center of said tubular reactor.

3. The apparatus of claim 1 wherein said gaseous reactant is heated oxygen and the reaction carried out in said tubular reactor is the high temperature production of titanium dioxide.

4. The apparatus of claim 3 which further comprises a first conduit sealingly extending into said cylindrical gaseous reactant injection chamber and positioned coaxially therewith for discharging a reactor scouring medium therein.

5. The apparatus of claim 4 which further comprises a second conduit sealingly extending into said cylindrical gaseous reactant injection chamber and positioned coaxially therewith and with said first conduit for discharging auxiliary fuel therein.

6. The apparatus of claim 5 which further comprises at least one cooling water jacket sealingly attached to the exterior of said cylindrical gaseous reactant injection chamber.

7. The apparatus of claim 6 which further comprises a heat shield disposed in said cylindrical gaseous reactant injection chamber between said annular opening therein and said closed forward end thereof.

8. The apparatus of claim 1, the cylindrical gaseous reactant chamber comprising a cylindrical corrosion resistant member at the rear end thereof.

9. The apparatus of claim 8, said cylindrical corrosion resistant member being formed of a ceramic material.

10. The apparatus of claim 9, wherein said ceramic material is selected from the group consisting of alumina, silica, alumina-silica, silicon carbides, silicon nitride and aluminum nitrides.

11. The apparatus of claim 10, wherein said ceramic material is selected from the group consisting of silicon nitrides and aluminum nitrides.

12. The apparatus of claim 11, wherein said ceramic material is a silicon-aluminum oxy nitride.

13. An improved apparatus for introducing a high flow rate of a gaseous reactant which contains or picks up solid particles into a tubular reactor comprising:
    a cylindrical gaseous reactant injection chamber having a forward end and a rearward end adapted to be sealingly connected to the upstream end of said tubular reactor and having an annular opening formed therein around the periphery thereof, said annular opening having a plurality of spaced vanes disposed therein to thereby form two or more radial slots therein; and
    an annular plenum chamber having an outside wall and sides sealingly attached to the exterior of said cylindrical gaseous reactant injection chamber over said annular opening, having a tangential inlet for receiving a high flow rate stream of said gaseous reactant containing solid particles and for causing said gaseous reactant to swirl in said plenum chamber, said annular plenum chamber also including a tangential boot formed therein downstream from said tangential inlet for catching said solid particles contained in said gaseous reactant.

14. The apparatus of claim 13 which further comprises a conduit attached within said plenum chamber having one end extending into said boot and the other end extending into one of said radial slots in said cylindrical gaseous reactant injection chamber.

15. The apparatus of claim 13 wherein said gaseous reactant is heated titanium tetrachloride gas and the reaction carried out in said tubular reactor is the high temperature production of titanium dioxide.

16. The apparatus of claim 15 which further comprises an internal liner formed of corrosion resistant material disposed in said annular plenum chamber.

17. The apparatus of claim 15 wherein said annular opening in said cylindrical gaseous reactant injection chamber and said radial slots formed therein are angled towards said rearward end thereof.

18. The apparatus of claim 13, wherein said cylindrical gaseous reactant chamber has a wear plate comprised of a corrosion resistant material at the rear end thereof.

19. The apparatus of claim 18, wherein said corrosion resistant material is formed of a ceramic material.

20. The apparatus of claim 19, wherein said ceramic material is selected from the group consisting of alumina, silica, alumina-silica, silicon carbides, silicon nitrides and aluminum nitrides.

21. The apparatus of claim 20 wherein said ceramic material is selected from the group consisting of silicon nitrides and aluminum nitrides.

22. The apparatus of claim 21 wherein said ceramic material is a silicon-aluminum oxy nitride.

23. An improved apparatus for introducing high flow rates of oxygen and titanium tetrachloride gas which contain or pick up solid particles into a tubular reactor comprising:

a cylindrical oxygen injection chamber having a closed forward end and a rearward end and having an annular opening around the periphery thereof;

a first annular plenum chamber having an outside wall and at least one side sealingly attached to the exterior of said cylindrical oxygen injection chamber, said first plenum chamber having an annular side outlet and having a tangential inlet for receiving a high flow rate stream of heated oxygen containing solid particles and for causing said stream to swirl therein;

a second annular plenum chamber having an outside wall and sides and having a larger diameter than said first plenum chamber sealingly attached to the exterior of said oxygen injection chamber, said second plenum chamber having an annular side inlet sealingly attached to said annular side outlet of said first plenum chamber;

an annular slot formed within said second plenum chamber adjacent to the side thereof opposite from said annular side inlet thereof, said annular slot being sealingly attached over said annular opening in said cylindrical oxygen injection chamber and extending to near the outside wall of said second plenum chamber;

a plurality of spaced vanes attached within said annular slot to thereby form two or more radial slots therein;

a cylindrical titanium tetrachloride gas injection chamber having a forward end sealingly connected to said rearward end of said cylindrical oxygen injection chamber and a rearward end connected to the upstream end of said tubular reactor and having an annular slot formed therein around the periphery thereof, said annular slot having a plurality of spaced vanes disposed therein to thereby form two or more radial slots therein; and a third annular plenum chamber having an outside wall and sides sealingly attached to the exterior of said cylindrical titanium tetrachloride gas injection chamber, having a tangential inlet for receiving a high flow rate stream of heated titanium tetrachloride gas containing solid particles and for causing said titanium tetrachloride gas to swirl in said plenum chamber, said third annular plenum chamber also including a tangential boot formed therein downstream from said tangential inlet for catching said solid particles contained in said titanium tetrachloride gas.

24. The apparatus of claim 23 which further comprises a conduit attached within said third plenum chamber having one end extending into said boot and the other end extending into one of said radial slots in said cylindrical titanium tetrachloride gas injection chamber.

25. The apparatus of claim 23 which further comprises an oxygen deflector disposed within said cylindrical oxygen injection chamber for distributing and aligning said oxygen therein whereby it flows through the center of said tubular reactor.

26. The apparatus of claim 23 which further comprises a first conduit sealingly extending into said cylindrical oxygen injection chamber and positioned coaxially therewith for discharging a reactor scouring medium therein.

27. The apparatus of claim 26 which further comprises a second conduit sealingly extending into said cylindrical oxygen injection chamber and positioned coaxially therewith and with said first conduit for discharging auxiliary fuel therein.

28. The apparatus of claim 27 which further comprises a heat shield disposed within said cylindrical oxygen injection chamber between said annular opening therein and said closed forward end thereof.

29. The apparatus of claim 23 which further comprises an internal liner formed of corrosion resistant material disposed in said third annular plenum chamber.

30. The apparatus of claim 29 wherein said annular slot and said radial slots in said cylindrical titanium tetrachloride gas injection chamber are angled towards said rearward end of said injection chamber.

* * * * *